F. C. STEVENS.
TOOTHED CYLINDER.
APPLICATION FILED AUG. 14, 1908.
1,031,097.
Patented July 2, 1912.
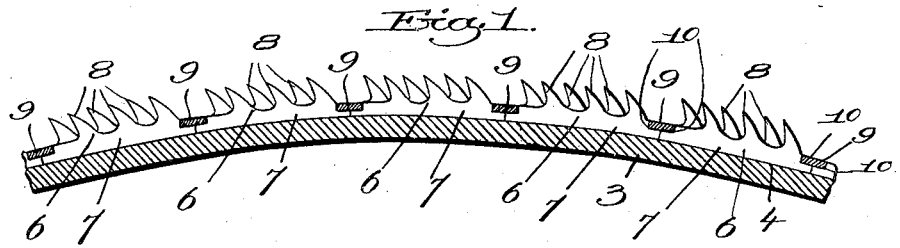
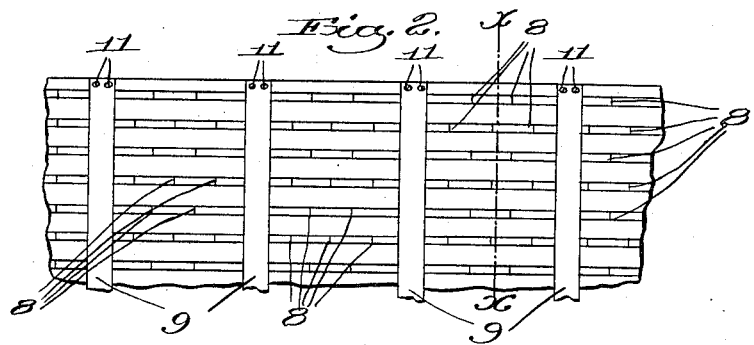
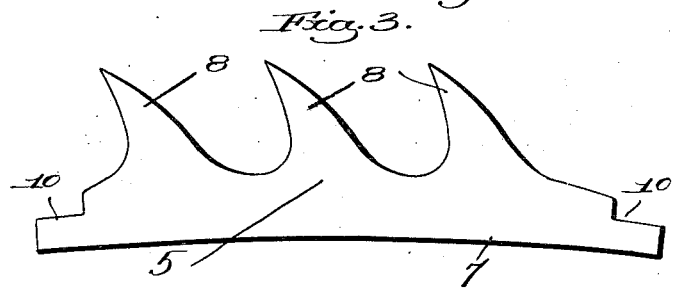
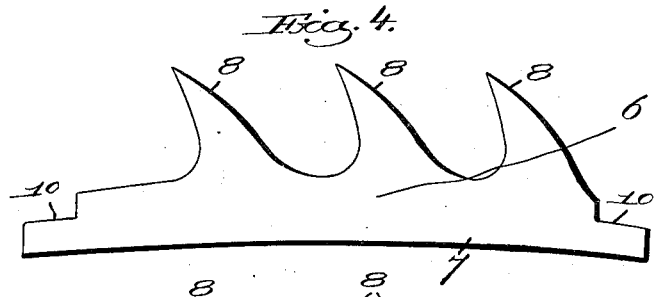
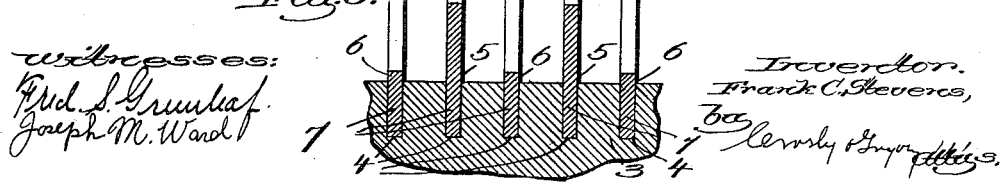

UNITED STATES PATENT OFFICE.

FRANK C. STEVENS, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

TOOTHED CYLINDER.

1,031,097.      Specification of Letters Patent.      Patented July 2, 1912.

Application filed August 14, 1908. Serial No. 448,514.

*To all whom it may concern:*

Be it known that I, FRANK C. STEVENS, a citizen of the United States, residing at North Andover, county of Essex, and State of Massachusetts, have invented an Improvement in Toothed Cylinders, of which the following description, in connection with the accompanying drawing, is a specification, like letters on the drawing representing like parts.

This invention relates to toothed cylinders for pickers or for other purposes and it has for its object to provide a cylinder of such a construction that it is less liable to become damaged than cylinders as ordinarily made, and if damaged can be repaired much more easily.

One common method of constructing cylinders for pickers is to make the body of the cylinder of wood or some other suitable material and then to insert the teeth in the cylinder at proper places, the teeth being usually all independent from each other. Where the individual teeth are driven into the wood body of the cylinder it is often somewhat difficult to remove any tooth when it becomes damaged or bent and when such tooth is removed it is not always possible to place a new tooth back in the cylinder in the same position because of the fact that the wood of the cylinder becomes broken somewhat at this point.

In accomplishing the above objects I propose to make the body of the cylinder of metal and to form the teeth of the cylinder on tooth-carrying sections which are detachably secured to the body of the cylinder in such a way that if the teeth or any tooth on any of the sections becomes damaged it can readily be removed from the cylinder and a new section substituted therefor. In securing the tooth-carrying sections to the body of the cylinder I preferably provide said body with peripheral grooves into which the tooth-carrying sections are set. The tooth-carrying sections may conveniently be made from sheet metal, each section comprising a body portion adapted to fit in the groove of the cylinder body and having teeth integral therewith and extending therefrom. The tooth-carrying sections are detachably secured to the cylinder body so that any one or more sections can easily be removed therefrom.

Referring now to the drawings wherein one embodiment of my invention is shown, Figure 1 is a section through a portion of a picker cylinder embodying my invention; Fig. 2 is a plan view of a part of the cylinder; Figs. 3 and 4 are enlarged views of tooth-carrying sections, and Fig. 5 is a section on the line *x—x*, Fig. 2.

I have not illustrated in the drawings the complete cylinder as it seemed to me that the portion of the cylinder shown was sufficient to give an adequate understanding of the invention.

The cylinder body is designated by 3 and is preferably made of metal. It will be sustained by the usual shaft (not shown) by which it is rotated. The body of the cylinder may conveniently be made in the form of a comparatively thin shell, as shown in Fig. 1, although this is not essential. Said body has formed on the periphery thereof a plurality of grooves 4 which extend clear around the body and are preferably parallel to each other. Each groove receives a plurality of tooth-carrying sections 5, 6 which may conveniently be made from sheet metal. Each section comprises a body portion 7 of a thickness substantially equal to that of the width of the groove, and one or more teeth 8 extending therefrom. I find that a satisfactory cylinder can be made by making each of the tooth-carrying sections of a length to sustain three teeth although the number of teeth which are formed on each section is not essential to the invention.

The tooth-carrying sections are preferably arranged in the parallel grooves in rows which extend longitudinally of the cylinder, and in the preferred embodiment of my invention, said sections are so made that the teeth of the alternate sections in any row have a staggered relation with reference to the teeth of the other sections of the row, as plainly seen in Figs. 1 and 2. To secure this result necessitates making the tooth-carrying sections in two different shapes such as shown in Figs. 3 and 4 respectively. The tooth-carrying section 5 shown in Fig. 3 has the right-hand tooth situated farther from the right hand end of the section than the right hand tooth of the section 6, the teeth of the two sections being so situated relative to each other that when the bodies of the two sections are in line, the teeth of one section have a staggered relation to those of the other section. The tooth-carrying sections are sustained in the grooves in the body in such a way that any section can be readily removed, and one convenient way of securing this end is to hold the sections in place by means of clamping bars 9 which extend longitudinally of the cylinder, and which overlie the ends of the sections. Each section is shown as having a notch 10 formed in each end thereof, and said notches have such a size with relation to the bar 9 that when the sections are in place the bars 9 fit into the notches formed in the meeting ends of adjacent sections, as plainly seen in Figs. 1 and 2. The clamping bars 9 are shown as secured to the cylinder body at the ends thereof or at any intermediate point if desired by means of screws or bolts 11 and said bars may be set into grooves formed in the face of the cylinder and extending longitudinally thereof. A cylinder constructed in this manner has an all-metal construction and if any of the teeth become damaged the particular sections containing said teeth can be removed and a new section substituted therefor.

The number of teeth on each section is not material, and the different sections may be made with three, four or any number of teeth without departing from the invention. It is desirable, however, that some of the sections should be made with the teeth nearer one end thereof than the other sections so that when the sections are placed in the cylinder the teeth will have a staggered relation to each other.

Having described my invention, what I claim as new and desire to secure by Letters Patent is:—

1. In a toothed cylinder, the combination with a cylindrical body having a plurality of separate peripheral grooves, of a plurality of tooth-carrying sections set into each groove end to end with their ends abutting, said sections in the several grooves being arranged in rows extending longitudinally of the cylinder so that the meeting ends of the sections in the various grooves are in alinement, each section having a solid body of a width to fit the groove, and a row of teeth extending from the body and also having a notch at each end, and clamping bars extending longitudinally of the cylinder and across all the grooves, said bars occupying the notches formed in the abutting ends of the sections.

2. In a toothed cylinder, the combination with a main body of the cylinder provided with means for holding toothed rings from movement longitudinally thereof and also having grooves extending lengthwise thereof, of toothed rings each composed of a plurality of parts, and locking bars for locking said ring sections in place mounted in said longitudinal grooves, each of said ring sections being engaged by two of said locking bars.

In testimony whereof, I have signed my name to this specification, in the presence of two subscribing witnesses.

FRANK C. STEVENS.

Witnesses:
ALFRED C. JENSEN,
WILLIAM D. RUNDLETT.

Copies of this patent may be obtained for five cents each, by addressing the "Commissioner of Patents, Washington, D. C."